United States Patent [19]
Chen et al.

[11] Patent Number: 5,416,733
[45] Date of Patent: May 16, 1995

[54] APPARATUS FOR FINDING QUOTIENT IN A DIGITAL SYSTEM

[75] Inventors: Sau-Gee Chen, Hsinchu; Chieh-Chih Li, Chia-I, both of Taiwan, Prov. of China

[73] Assignee: United Microelectronics Corp., Hsinchu City, Taiwan, Prov. of China

[21] Appl. No.: 188,053

[22] Filed: Jan. 26, 1994

[51] Int. Cl.⁶ .............................................. G06F 7/52
[52] U.S. Cl. .................................. 364/746.2; 364/761
[58] Field of Search ...................... 364/746.2, 761, 764, 364/766

[56] References Cited

U.S. PATENT DOCUMENTS

| | | | |
|---|---|---|---|
| 4,866,655 | 9/1989 | Nishiyama et al. | 364/761 |
| 4,873,660 | 10/1989 | Nishiyama et al. | 364/761 |
| 4,878,192 | 10/1989 | Nishiyama et al. | 364/761 |
| 4,935,892 | 6/1990 | Nishiyama et al. | 364/746.2 |

OTHER PUBLICATIONS

Tung, "Division Algorithm for Signed-Digit Arithmetic" *IEEE Trans. on Computers* Sep. 1968, pp. 887-889.

*Primary Examiner*—David H. Malzahn
*Attorney, Agent, or Firm*—Ladas & Parry

[57] ABSTRACT

A fast divider is disclosed in the present invention. It utilizes a division method which uses a smaller quotient digit set of $\{-1, 1\}$ than $\{-1, 0, 1\}$ that used by known algorithms, therefore accelerates the speed of calculation. Partial remainders are computed with the signs of remainders decided independently and in parallel. By taking the absolute values of the remainders, the remainders are successively subtracted without the need of knowing the signs of remainders, while signs of the remainders can be decided in parallel and independently at the same time. The method adopts non-restoring division operation and CSA (carry save adder) type of operation for fast subtraction. The method is also an on-line algorithm that facilitates highly pipelined operations while it is much simpler than the existing on-line algorithms.

4 Claims, 4 Drawing Sheets

APPARATUS FOR FINDING QUOTIENT IN A DIGITAL SYSTEM

BACKGROUND OF THE INVENTION

The present invention relates to an apparatus for finding a quotient, especially to an apparatus for finding a quotient in a digital system.

Inherently, division operation is a sequential operation. The quotient digits are produced only after the sign of the remainder has been detected. As a result, division operation is much slower than a multiplication operation. Efforts have been put in speeding up the division operation. It is noted that the SRT algorithm (C. V. Freiman, "Statistical Analysis of Certain Binary division algorithms," Proc. IRE, Vol. 49, Jan. 1961, pp. 91–103; K. Hwang, Computer Arithmetic: Principles, Architectures, and Design, 1979, pp. 222–223) eliminates the restoring operations of the partial remainders. Another algorithm disclosed by K. Hwang confines the quotient digits either to be 1 or −1, depending on the signs of remainders. However, the bottleneck of those algorithms lies in sign detection of the remainder. Fast addition algorithms such as CLA (carry-lookahead addition) shorten the operation time, but results in complex hardware structures.

Recently, division algorithms based on SD (signed-digit) number representation was proposed which is much faster than the previous algorithm (S. Kuninobu et al., "Design of High Speed MOS Multiplier and Divider Using Redundant Binary Representation," IEEE Proceeding of Symposium on Computer Arithmetic, 1987, pp. 80–86). This algorithm considerably shortens the time for remainder subtraction by using carry-propagation-free SD addition. However, it is much more complex because in each iteration the SD algorithm must check three most significant digit (MSD) bits of the remainder to decide the quotient digit in the set of $\{-1, 0, 1\}$, and then perform the SD addition. Moreover, the final SD result must be converted to binary representation. Also note that the signed-digit addition is more complicated than the conventional carry-save adder (CSA).

Another type of algorithm entirely avoids the slow subtract-detect-shift type of operation previously mentioned. They transform the division operation to a series of multiplication operations that converge to the original quotient. Among the examples are the constant convergence (S. Waser and M. J. Flynn, Introduction to Arithmetic for Digital Systems Designers, New York: CBS College Publishing, Chap. 5, 1982) and quadratic convergence (P. Markenstein, "Computation of Elementary Functions on the IBM RISC System/6000 Processor," IBM Journal of Research and Development, Vol. 34, 1990, pp. 111–119; D. A. Patterson and J. L. Hennessy, Computer: A Quantitative Approach, San Mateo, Calif., Morgan Kaufman, 1990) division algorithms which are based on Newton-Raphson algorithm. They are often found in multiplier-based processors. They are still sequential type of operation to certain degree, and obviously require much more shift-and-add operations.

There is an on-line division algorithm that facilitates serial/serial division operation (K. S. Trivedi and M. D. Ercegovac, "On-Line Algorithms for Division and Multiplication," IEEE Trans. on Computers, Vol. C-26, No. 7, July 1977). This algorithm has advantages such as that: (a) it is pipelined at digit level; (b) all operands and results are communicated digit serially, and (c) result digits are on-line obtained after a few initial delay. On the other hand, among some of its disadvantages are: (a) it requires more complex three-input signed-digit addition operation; (b) it needs more complicated quotient decision circuit for range detection of the remainder, and (c) output results have to be converted to binary representations.

SUMMARY OF THE INVENTION

In this work, a fast radix-2 division algorithm and its architecture is proposed. The algorithm adheres to the shift/subtract-and-add type of division operation because it uses less iteration steps than those utilizing multiplicative approaches. The key idea behind this algorithm is to separate the sign detection operation of remainder from the remainder subtraction operation. By taking the absolute values of the remainders, we can successively subtract the remainders without the need of knowing the signs of remainders, while signs of the remainders can be decided in parallel and independently at the same time. To enhance the algorithm's performance, several design techniques were incorporated into its architectural realization.

The new algorithm and its architecture try to retain most advantages of the aforementioned algorithms as possible, and simultaneously eliminate their disadvantages. The algorithm adopts non-restoring division operation and CSA type of operation for fast subtraction. Quotient digit set of $\{1, -1\}$ is assumed for fast quotient conversion to binary representation. The algorithm is also an on-line algorithm that facilitates highly pipelined operation while it is much simpler than the existing on-line algorithms.

This object of the present invention are fulfilled by providing a digital device for finding a quotient from a divisor and a dividend. The digital device comprises a plurality of operators, each coupled in sequence, each of the operators receiving one digit of the divisor and one digit of the dividend and performing signed-digit subtraction, then outputting the result of the partial remainder of the subtraction, a plurality of negating circuits for taking the absolute value of the partial remainder, each coupled in the same sequence with the operators and coupled with the corresponding operator, each of the negating circuits receiving one digit of the result of the partial remainder of the subtraction from the corresponding operator and a flag from the preceding negating circuit, and negating the sign of the digit received from the corresponding operator when the flag received from the preceding negating circuit is negative, and when the flag received from the preceding negating circuit is zero and the digit received from the corresponding operator is negative, or keeping the sign of the digit received from the corresponding operator when the flag received from the preceding negating circuit is positive, or when the flag received from the preceding negating circuit is zero and the digit received from the corresponding operator is positive or zero, then outputting the digit to the preceding operator of the corresponding operator for next iteration, or outputting a positive flag when the flag received from the preceding negating circuit is positive or when the flag received from the preceding negating circuit is zero and the digit received from the corresponding operator is positive, and outputting a negative flag when the flag received from the preceding negating circuit is negative and when the flag received from the preceding negating circuit is zero and the digit received from the corresponding operator is negative, and outputting a zero flag when the flag received from the preceding negating circuit is zero and the digit received from the corresponding operator is zero, a quotient decision circuit, receiving the flag outputted by the negating circuit at the end of sequence, and performing exclusive-OR operation with the last flag outputted by the negating circuit at the end of sequence, then negating and outputting the result of the exclusive-OR operation as one of the digit of the quotient, and a plurality of shift registers interposed between each of said circuits, for adjusting circuit timing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

The present invention will become more fully understood from the detailed description given hereinafter and the accompanying drawings which are given by way of illustration only, and thus are not limitative of the present invention and wherein:

FIG. 2b is a schematic circuit diagram showing an embodiment of a half-adder HA1 shown in FIG. 2a;

FIG. 2c is a schematic circuit diagram showing an embodiment of a half-adder HA2 shown in FIG. 2a;

FIG. 3b is a schematic circuit diagram showing an embodiment of the negating circuit shown in FIG. 3a;

FIG. 4b is a schematic circuit diagram showing an embodiment of the quotient decision circuit shown in FIG. 3a.

DETAILED DESCRIPTION OF THE EMBODIMENTS

Figure 1:
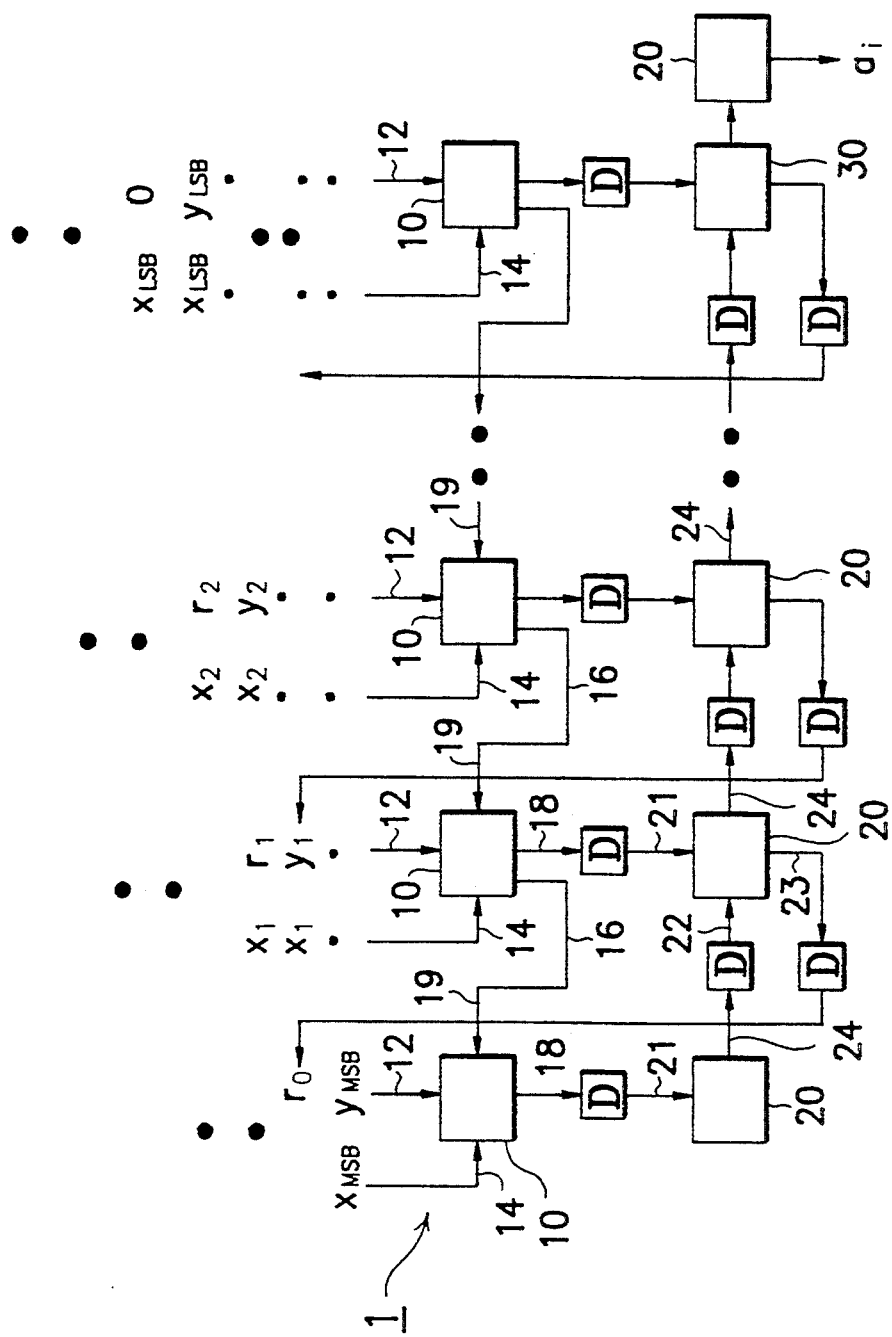
FIG. 1 is a schematic block diagram showing a divider according to the present invention.

For achieving fast division, a new division algorithm is discussed hereinafter.

NEW DIVISION ALGORITHM

Given normalized n-bit signed-magnitude operands $\frac{1}{2} \leq |X| < 1$, $\frac{1}{2} \leq |Y| < 1$, quotient $Q_2$ of Y/X can be solved using the following principles, where the quotient digits $Q_2 = a_s a_0 \cdot a_1 a_2 \ldots a_n$ is in sign-magnitude representation and $a_s$ is the sign bit.

Principle 1

$a_s$ equals to the result of exclusive-OR of the sign bits $y_s$ and $x_s$ of Y and X, respectively, i. e., $a_s = y_s \oplus x_s$.

Principle 2

Partial remainder $R_{i+1}$ can be solved by modifying the conventional, nonrestoring algorithm stated by K. Hwang as follows. The signed-binary quotient Q has its quotient digit $q_i \epsilon \{1, -1\}$, and $$R_{i+1} = 2|R_i - q_{i+1}'X| \tag{1}$$

where $R_0 = |Y|$, $q_0 = 1$, $q_i'$ is the i-th pseudo quotient digit. Since $R_{i+1}$ is always positive, Eq. (1) can be rewritten as $$R_{i+1} = 2|R_i - X| \tag{2}$$

$$q_{i+1} = \begin{cases} 1, & \text{if } S_{i+1} = 0 \\ 1, & \text{if } Z_{i+1} = 1 \\ -1, & \text{if } S_{i+1} = 1 \end{cases} \tag{3}$$

$$a_i = \begin{cases} 1, & \text{if } q_{i+1} = 1 \\ 0, & \text{if } q_{i+1} = -1 \end{cases} \tag{4}$$

where
$S_{ri}$ = The sign of remainder ($R_i - X$),
$S_i$ = True sign of i-th remainder of $S_{i-1} \oplus S_{ri}$,
$Z_i$ = Zero Flag, $Z_0 = 0$, and
$S_0 = S_{r0} = \text{Sign}\{R_0\} = 0$.

The algorithm can be performed using the method described below.

NEW DIVISION METHOD

Define signed-magnitude numbers $Y_s = y_s \cdot y_1 y_2 \ldots y_n$, $X_s = x_s \cdot x_1 x_2 \ldots x_s$, and $Q_s = q_s q_0 \cdot q_1 q_2 \ldots q_b$ in the signed-binary representation, i. e. $q_i \epsilon \{1, -1\}$, and the sign-magnitude representation of $Q_2 = a_s a_0 \cdot a_1 a_2 \ldots a_b$, $a_i \epsilon \{0, 1\}$. The quotient $Q_2$ of $X_s/Y_s$ can be solved by the following steps:

Step 1

$a_s = y_s \oplus x_s$.

Step 2

Define $Y = y_1 y_2 \ldots y_n$, $X = x_1 x_2 \ldots x_s$, $Q = a_0 a_1 a_2 \ldots a_b$, $R_0 = Y$, $i = 0$, and $S_0 = 0$.

Step 3

Align the first non-zero bit of X with the first non-zero digit of $R_0$.

Step 4

Subtract X from $R_i$ and yield next signed-digit partial remainder $R_{i+1}$. Set the sign of $R_{i+1}$ to $S_{ri+1}$ (note that the sign of $R_{i+1}$ equals the sign of first non-zero digit of $R_{i+1}$). Set the result of $S_i \oplus S_{ri+1}$ to the true sign of the next remainder $S_{i+1}$, i. e. $S_{i+1} = S_i \oplus S_{ri+1}$. Set $a_i$ to 1 if $S_{i+1} = 0$ (means the remainder is positive) or $R_{i+1} = 0$. Set $a_i$ to 0 if $S_{i+1} = 1$ (means the remainder is negative).

Step 5

If $S_{i+1} = 1$, then take the absolute value of $R_{i+1}$ (by negating the signs of all digits). Shift $R_{i+1}$ left by one bit. Add 1 to i. Repeat step 4 until i reaches a predetermined value or $R_{i+1} = 0$.

For better comprehension, two examples are used to demonstrate the division method hereinafter:

EXAMPLE 1

$Y = 01010001_2 = 81$
$X = 00001001_2 = 9$, $S_0 = 0$

```
     1010001    R_0 = Y
    -1001000    X
     0001001    R_1 > 0 then S_{r1} = 0,
                S_1 = S_{r1} ⊕ S_0 = 0, a_0 = 1
```

SHIFT LEFT ONE BIT

```
     0010010
    -1001000    X
    -0110110    R_2 < 0 then S_{r2} = 1,
                S_2 = S_{r2} ⊕ S_1 = 1, a_1 = 0
```

TAKE ABSOLUTE VALUE
 0110110

SHIFT LEFT ONE BIT

```
     1101100
    -1001000    X
     0100100    R_3 > 0 then S_{r3} = 0,
                S_3 = S_{r3} ⊕ S_2 = 1, a_2 = 0
```

SHIFT LEFT ONE BIT

```
     1001000
    -1001000    X
     0000000    R_4 = 0 then a_3 = 1
```

Result:

The quotient = $a_0 a_1 a_2 a_3 = 1001_2 = 9$
and remainder = 0

EXAMPLE 2

In this example, note that a digit with a bar means a digit having negative value, e.g.

$$1\bar{1}_2 = 2 + (-1) = 1.$$

$Y = 10101110_2 = 174$
$X = 11_2 = 3$

```
     10101110   R_0 = Y
         -11    X
     0̄1101110   R_1 < 0 then S_{r1} = 1,
                S_1 = S_{r1} ⊕ S_0 = 1, a_0 = 0
```

TAKE ABSOLUTE VALUE
 01̄01̄1̄10

SHIFT LEFT ONE BIT

```
     1̄1̄011100
         -11   X
     1̄0011100   R_2 < 0 then S_{r2} = 1,
                S_2 = S_{r2} ⊕ S_1 = 0, a_1 = 1
```

TAKE ABSOLUTE VALUE
 10011100

SHIFT LEFT ONE BIT

```
     100111000
         -11   X
      01111000  R_3 > 0 then S_{r3} = 0,
                S_3 = S_{r3} ⊕ S_2 = 0, a_2 = 1
```

SHIFT LEFT ONE BIT

```
     11110000
         -11   X
      00110000  R_4 > 0 then S_{r4} = 0,
                S_4 = S_{r4} ⊕ S_3 = 0, a_3 = 1
```

SHIFT LEFT ONE BIT

```
     01100000
         -11   X
     1̄0100000   R_5 < 0 then S_{r5} = 1,
                S_5 = S_{r5} ⊕ S_4 = 1, a_4 = 0
```

TAKE ABSOLUTE VALUE
 101̄00000

SHIFT LEFT ONE BIT

```
     101̄000000
          -11   X
      00000000  R_6 = 0 then a_5 = 1, a_6 = 0
```

The quotient = $a_0 a_1 a_2 a_3 a_4 a_5 a_6 = 0111010_2 = 58$,
and remainder = 0

Since absolute values of the partial remainders are computed instead of their actual values, the algorithm facilitates parallel computations of partial remainder and quotient digit. To further speed up the operation of subtraction in the preferred embodiment, we use modified signed-digit operation which will be briefly discussed hereinafter.

MODIFIED SIGNED-DIGIT SUBTRACTION

Since computations of Eq. (2) involves only the subtraction operation of two positive numbers, $R_i$ and $X$, we can speed up the computation by defining the CSA-like operation as follows.

$$y_j - x_j = 2c_{j+1} + t_j \quad (5.a)$$

$$t_j + c_j = s_j \quad (5.b)$$

wherein
$y_j, s_j \in \{-1, 0, 1\}$
$x_j, t_j \in \{0, 1\}$
$c_j \in \{-1, 0\}$.

Here, a signed-digit bit $y_j$ (represents the j-th digit of $R_i$) subtracts a binary digit $x_j$, then generates carry $c_{j+1}$ and intermediate result $t_j$. The finial result $s_j$ (represents the j-th digit of $R_{i+1}$, before taking absolute value) is obtained by adding $t_j$ and the carry-in bit $c_j$. Since $s_j \{-1, 0, 1\}$, there will be no carry generated from $t_j + c_j$. As a result, the modified signed-digit subtraction efficiently eliminates carry propagation. In addition, the complexity of this operation is similar to that of conventional CSA. Example 3 depicts the modified subtraction method where $T_i = t_1 t_2 \ldots t_n$ and $C_i = c_1 c_2 \ldots c_n$.

EXAMPLE 3

$Y = 01010001_2 = 81$
$X = 00001001_2 = 9$

```
     1010001    R_0 = Y
    -1001000    X
     0011001    T_1
    -0001000    C_1
     0001001    R_1 > 0 then S_{r1} = 0,
                S_1 = S_{r1} ⊕ S_0 = 0, a_0 = 1
```

SHIFT LEFT ONE BIT

```
     0010010
    -1001000    X
     1011010    T_2
    -1001000    C_2
     1̄1001010   R_2 < 0 then S_{r2} = 1,
                S_2 = S_{r2} ⊕ S_1 = 1, a_1 = 0
```

TAKE ABSOLUTE VALUE

-continued $$1\overline{1}00\overline{1}0\overline{1}0$$

SHIFT LEFT ONE BIT $$
\begin{array}{rl}
1\overline{1}00\overline{1}0\overline{1}00 & \\
-\phantom{1}1001000 & X \\
\hline
1\overline{1}1011\overline{1}00 & T_3 \\
-011011100 & C_3 \\
\hline
00\overline{1}100100 & R_3 > 0 \text{ then } S_{r3} = 0, \\
& S_3 = S_{r3} \oplus S_2 = 1, a_2 = 0
\end{array}
$$

SHIFT LEFT ONE BIT $$
\begin{array}{rl}
1\overline{1}001000 & \\
-\phantom{1}1001000 & X \\
\hline
10000000 & T_4 \\
-01000000 & C_4 \\
\hline
0 & R_4 = \text{then } a_3 = 1
\end{array}
$$

Result:

The quotient = $1001_2$ = 9,
and remainder = 0

As shown in the above example, $T_i$ and $C_i$ are calculated first, then $R_i$ can be easily decided. The truth table of $t_j$ and $c_{j+1}$ value are listed in table 1 where the signed-digit $r_j$ of $R_i$ is represented by two bits, $r_j^1$ and $r_j^2$. $r_j^1 = \text{sign}\{r_j\} \cdot r_j^2 = |r_j|$.

TABLE 1

TRUTH TABLE OF $t_j$ AND $c_{j+1}$

| $x_j$ | $r_j^1$ | $r_j^2$ | $c_{j+1}$ | $t_j$ |
|---|---|---|---|---|
| 0 | 0 | 0 | 0 | 0 |
| 0 | 0 | 1 | 0 | 1 |
| 0 | 1 | 1 | 1 | 1 |
| 1 | 0 | 0 | 1 | 1 |
| 1 | 0 | 1 | 0 | 0 |
| 1 | 1 | 1 | 1 | 0 |

Note that $r_j$ represents j-th digit of $R_i$ here.

The truth table of $s_j$ (represents the j-th digit of $R_{i+1}$, before taking absolute) is listed in table 2.

TABLE 2

TRUTH TABLE OF $s_j$

| $c_j$ | $t_j$ | $s_j^1$ | $s_j^2$ |
|---|---|---|---|
| 0 | 0 | 0 | 0 |
| 0 | 1 | 0 | 1 |
| 1 | 0 | 1 | 1 |
| 1 | 1 | 0 | 0 |

From the above tables we can see that the signed-digit subtraction can be achieved by a simple digital circuit, and can be pipe-lined for better performance.

CONCLUSION

In summary, the division algorithm have the advantages as follows:

a) It uses a smaller quotient digit set of $\{1, -1\}$ than $\{-1, 0, 1\}$, that simplifies that quotient decision circuits like some known algorithms do, but achieves the exact division and trivial conversion of the results from signed-binary representation to binary representation.

b) It needs no quotient estimator.

c) In each iteration, the algorithm computes partial remainders without knowing the signs of previous remainders and decides the signs of remainders independently and in parallel. In addition, these two operations are done in pipelined fashion and in digit level with maximum throughput rate.

d) Its architecture is basically consists of the simple CSA type cells.

e) It can handle either positive or negative operands.

From above discussion, the proposed division algorithm is very efficient. The new algorithm's realization is demonstrated hereinbelow, by two preferred embodiments of the present invention.

RADIX-2 BIT-SERIAL DIVIDER

FIG. 1 shows the structure of an n-bit radix-2 bit-serial divider 1 according to the present invention. Divider 1 includes n+1 operators 10, n+1 negating circuits 20, a quotient decision circuit 30, and a plurality of shift registers D. Shift registers D are used for adjusting the timing of the entire circuit. It should be noted that this circuit can be easily modified, by one who skilled in the art, to perform division operation on other bit numbers.

Operator 10 is used to subtract the dividend X from the divisor Y or the partial remainders of Y, then output the partial remainder of the subtraction. Each operator 10 has a first input 12 and a second input 14, for respectively receiving one bit of the divisor Y and the dividend X in sequence, from the most significant bits $y_{MSB}$ and $x_{MSB}$, to the least significant bits $y_{LSB}$ and $x_{LSB}$. Each bit $y_i$ of Y is loaded to the corresponding first input 12, and each bit $x_i$ of X is loaded to the corresponding second input 14. Each operator 10 has a third input 19, a first output 16 and a second output 18. Each first output 16 is connected to the third input 19 of the preceding operator 10 in sequence. Each operator 10 subtracts one bit $x_i$ of the dividend X, which is inputted from the second input 14, from one bit $y_i$ and yields one bit $s_i$ of the result. It should be noted that of the divisor Y, which is inputted from the first input 12, $y_i$ and $s_i$ are all signed-digits, where $y_i$ is represented by two bits $y_i^1$ and $y_i^2$, and $s_i$ is represented by two bits, $s_i^1$ and $s_i^2$. Although it is not shown in FIG. 1, $y_i$ and $s_i$ are both transferred by two wires in the circuit. In the present embodiment, signed-digits $-1$, 0, 1 are represented by 11, 00, 01, respectively.

Figure 2A:
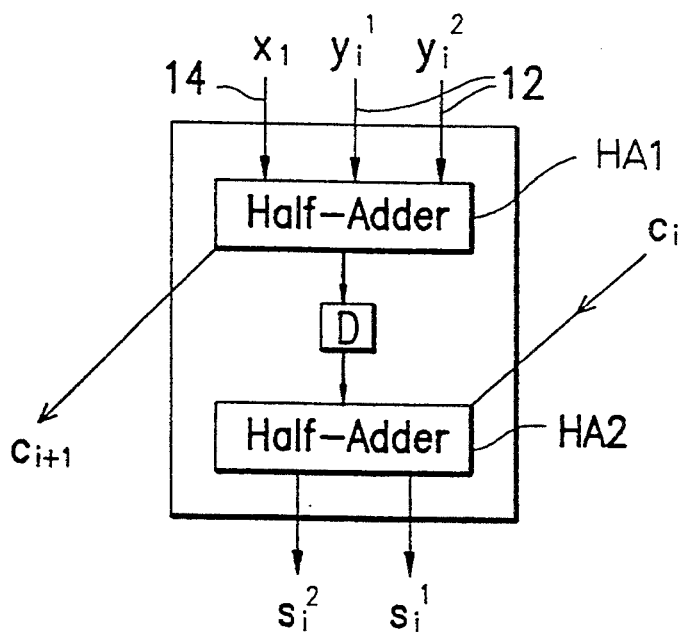
FIG. 2a is a schematic block diagram showing a full-adder.
Figure 2B:
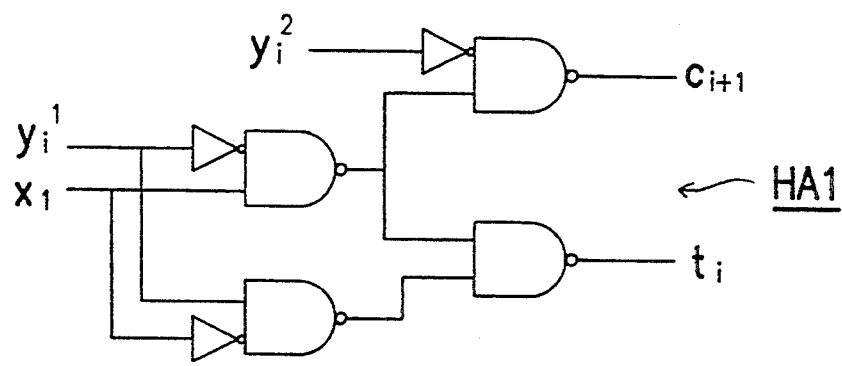
Figure 2C:
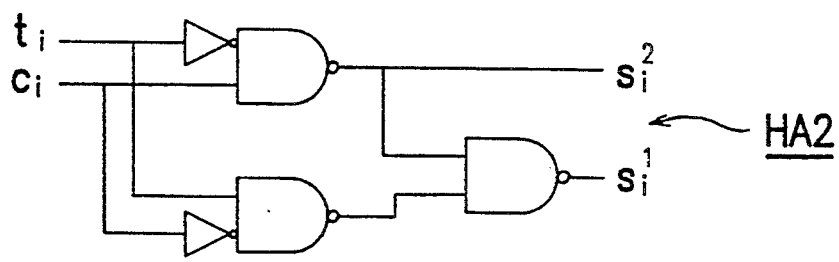

Please refer to FIGS. 2a, 2b, and 2c. FIG. 2a shows the block diagram of the preferred embodiment of the operator 10. Three bits $x_i$, $y_i^1$ and $y_i^2$ (representing $x_i$ and $y_i$) are sent to a half-adder HA1. The half-adder HA1 performs the calculation of Eq. 5.a, then outputs the carry-in bit $c_{i+1}$ and the intermediate result $t_i$. After passing through shift register D, $t_i$ is sent into another half-adder HA2 together register D, $t_i$ is sent into another half-adder HA2 together with the carry-in bit $c_i$ (from the half-adder HA1 of another operator 10 on the right side). Half-adder HA2 performs the calculation of Eq. 5.b, then outputs the finial result $s_i$ with two bits $s_i^1$ and $s_i^2$. The preferred embodiments of the half-adders HA1 and HA2 are shown in FIGS. 2b and 2c respectively. The truth table of the half-adder HA1 is the same as Table 1. The truth table of the half-adder HA2 is the same as Table 2.

The negating circuit 20 is used to take the absolute value of the partial remainder $s_i$, that is, in signed-digit operation, to decide whether the signs of the digits of the partial remainder outputted by the operator 10 should be negated or not. The negating circuits 20 find out the first non-zero digit of $s_i$, and check its sign. If it is positive, then $s_i$ will pass the negating circuits 20 without changing. If it is negative, then the signs of all non-zero digits of $s_i$ will be negated.

Figure 3A:
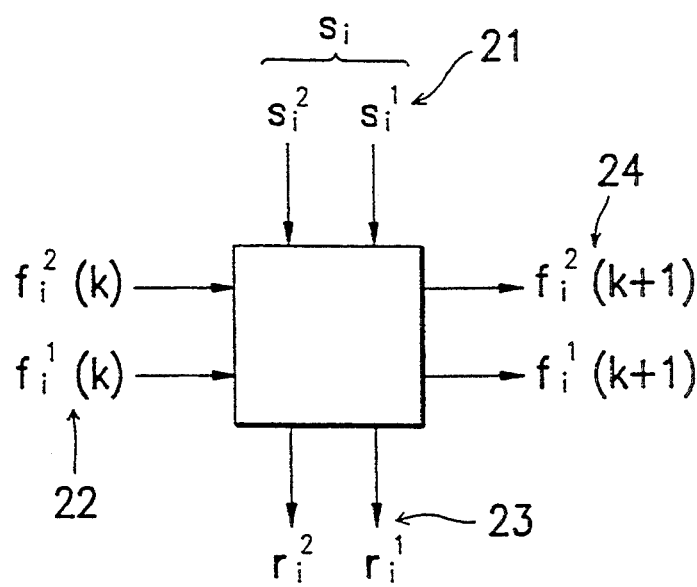
FIG. 3a is a schematic block diagram showing a negating circuit.
Figures 1, 3B:
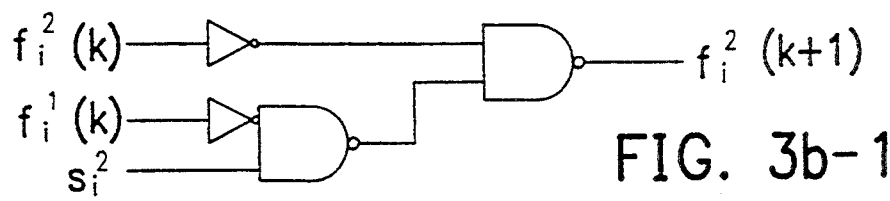
Figures 2, 3B:
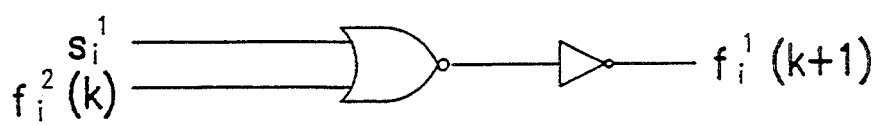
Figures 3, 3B:
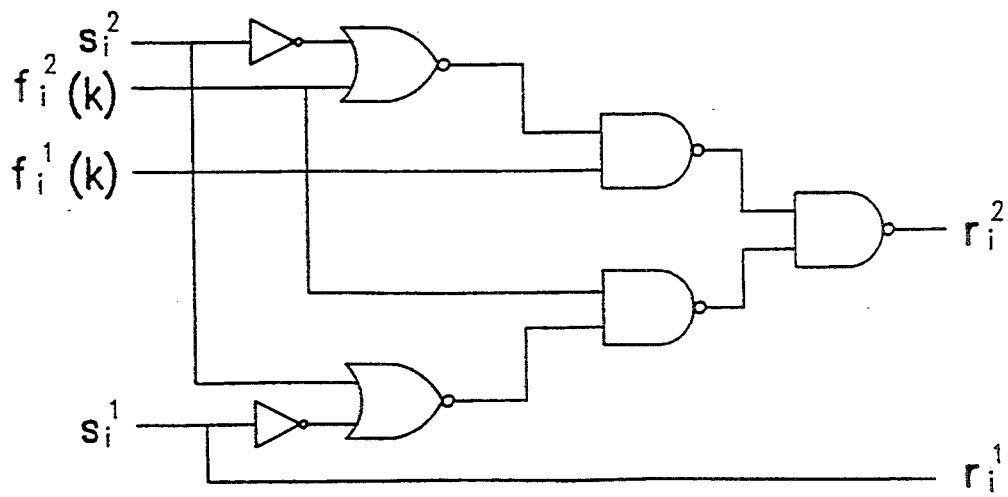

As shown in FIG. 3a, the k-th negating circuits 20 has a first input 21 for receiving one digit $s_i$ of the final result from one of the operator 10, a first output 23 for outputting one digit $r_i$ of the partial remainder, a second input 22 for receiving a flag digit $f_i(k)$ from another preceding negating circuit 20, and a second output 24 for outputting a flag digit $f_i(k+1)$. It should be noted that $s_i$, $r_i$, $f_i(k)$, and $f_i(k+1)$ are all signed digits, where $s_i$ is represented by $s_i^1$ and $s_i^2$, $r_i$ is represented by $r_i^1$ and $r_i^2$, $f_i(k)$ is represented by $f_i^1(k)$ and $f_i^2(k)$, $f_i(k+1)$ is represented by $f_i^1(k+1)$ and $f_i^2(k+1)$. A preferred embodiment of the negating circuit 20 is illustrated in FIG. 3b.

Referring to FIG. 1, the second input 22 of each negating circuit 20 is coupled to the second output 24 of the preceding negating circuit 20 through a shift register D in sequence. The first input 21 of each negating circuit 20 is coupled to the corresponding operator 10 through a shift register D. The first output 23 of each negating circuit 20 is coupled to the first input 12 of the preceding operator through a shift register D. The truth table of the negating circuit 20 is listed in table 3.

TABLE 3

TRUTH TABLE OF $f_i(k+1)$

| $f_i^2(k)$ $f_i^1(k)$ | $s_i^2$ | $s_i^1$ | $f_i^2(k+1)$ $f_i^1(k+1)$ | $r_i^2$ | $r_i^1$ |
|---|---|---|---|---|---|
| 0 0 | 0 | 0 | 0 0 | 0 | 0 |
| 0 0 | 0 | 1 | 0 1 | 0 | 1 |
| 0 0 | 1 | 1 | 1 1 | 0 | 1 |
| 0 1 | 0 | 0 | 0 1 | 0 | 0 |
| 0 1 | 0 | 1 | 0 1 | 0 | 1 |
| 0 1 | 1 | 1 | 0 1 | 1 | 1 |
| 1 1 | 0 | 0 | 1 1 | 0 | 0 |
| 1 1 | 0 | 1 | 1 1 | 1 | 1 |
| 1 1 | 1 | 1 | 1 1 | 0 | 1 |

Figure 4A:
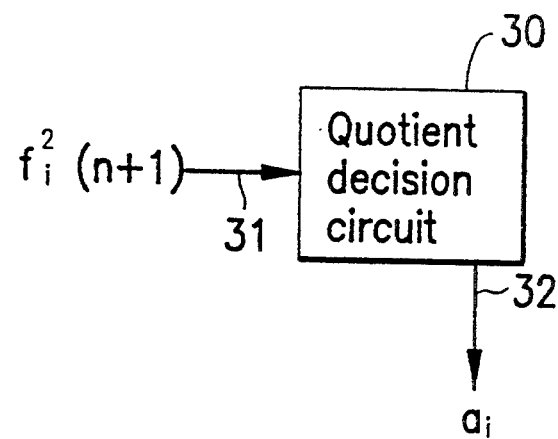
FIG. 4a is a schematic block diagram showing a quotient decision circuit.
Figure 4B:
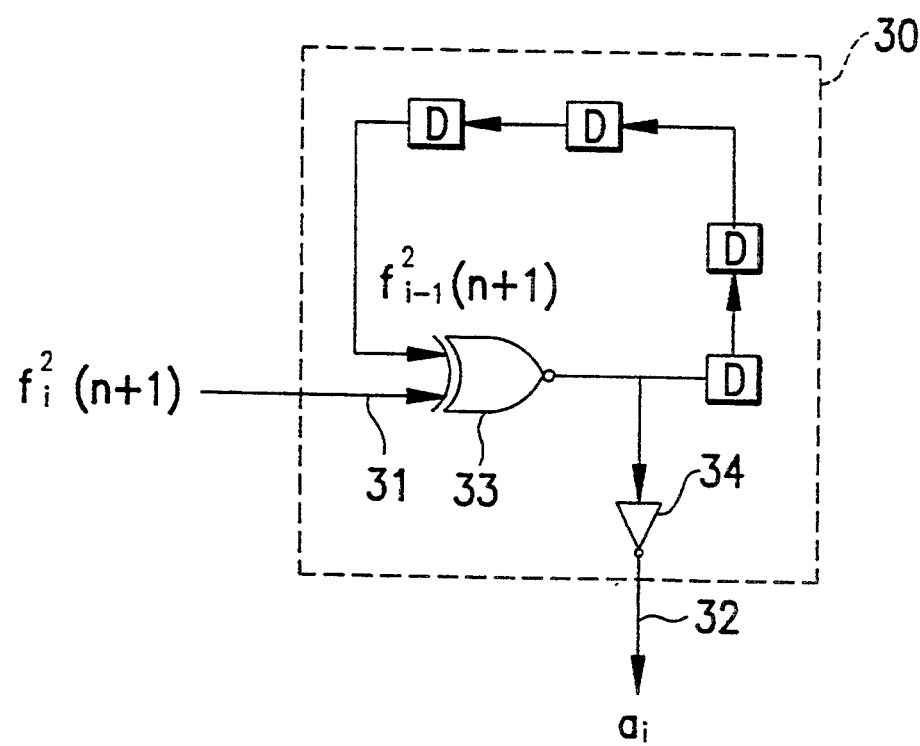

As shown in FIG. 1 and FIG. 4, the quotient decision circuit 30 has a first input 31 coupled to the n-th negating circuit 20 for receiving the flag digit $f_i(n+1)$ from the n-th negating circuit 20 (only $f_i^2(n+1)$ is needed to decide the quotient digit), and a quotient digit output 32 for outputting computed quotient digit $a_i$. The quotient decision circuit 30 decides the quotient digit $a_i$ by executing Eq. 3 and Eq. 4, that is, to take the exclusive-OR value of sign$\{f_i(n+1)\}$ and sign$\{f_{i-1}(n+1)\}$, e.g. $f_i^2(n+1) \oplus f_{i-1}^2(n+1)$, then negate it, using a exclusive-OR (EOR) gate 33 and a NOT gate 34.

If the first operator 10 outputs an intermediate result $s_i=1$ (e.g. 01) which means the remainder is positive, then the first negating circuit 20 coupled to the first operator 10 receives it and outputs a positive flag $f_i(1)$ (e.g. 01), and transmits it to the quotient decision circuit 30. Each of other operators 10 and negating circuits 30 performs the same operation, and outputs the finial result $r_i = s_i$ to the preceding operator 10 for next iteration.

If the first operator 10 outputs an intermediate result $s_i = -1$ (e.g. 11) which means the remainder is negative, then the first negating circuit 20 coupled to the first operator 10 receives it and outputs a negative flag $f_i(1)$ (e.g. 11), and transmits it to the quotient decision circuit 30. Each of other operators 10 and negating circuits 30 performs the same operation, and inverses the sign of the intermediate result $s_i$, then outputs the finial result $r_i = -s_i$ to the preceding operator 10 for next iteration.

If the first operator 10 outputs an intermediate result $s_i=0$ (e.g. 00), then the first negating circuit 20 coupled to the first operator 10 receives it and outputs a zero flag $f_i(1)$ (e.g. 00), and the sign of the remainder is still not determined. Each of other operators 10 and negating circuits 30 performs the same operation, until there is a non-zero intermediate result $s_i$, then decides the sign of the remainder and whether the sign of the intermediate result should be negated, and finally outputs the finial result $r_i$ to the preceding operator 10 for next iteration.

When $f_i(n+1)$ and $f_{i+1}(n+1)$ are both positive or negative, then the quotient decision circuit 30 outputs a quotient digit $a_i = 1$. When $f_i(n+1)$ is positive and $f_{i+1}(n+1)$ is negative, or $f_i(n+1)$ is negative and $f_{i+1}(n+1)$ is positive, then the quotient decision circuit 30 outputs a quotient digit $a_i = 0$. If all remainder digits are zero, e.g. there is exact division, then the quotient decision circuit 30 outputs a quotient digit $a_i = 1$. After n times iteration, a n-digit quotient can be determined. More quotient digits can be determined if more iteration is performed.

The algorithm and architecture can be extended to higher radix divisions such as radix-4 division. Since the remainders are taken absolute values, the digit set contains only digits 1 and 2 is sufficient for the entire radix-4 operation. This greatly reduces the number of search regions for the quotient digits, in contrast to the bigger set of {0, 1, 2, 3} that existing algorithms allow.

While the invention has been described by way of an example and in terms of several preferred embodiments, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A digital device for finding a quotient from a divisor and a dividend, which comprises:

a plurality of operators, each coupled in sequence, each of the operators receiving one digit of the divisor and one digit of the dividend and performing signed-digit subtraction, then outputting the result of the partial remainder of the subtraction;

a plurality of negating circuits for taking the absolute value of the partial remainder, each coupled in the same sequence with the operators and coupled with the corresponding operator, each of the negating circuits receiving one digit of the result of the partial remainder of the subtraction from the corresponding operator and a flag from a preceding negating circuit, and negating the sign of the digit received from the corresponding operator when the flag received from the preceding negating circuit is negative, and when the flag received from the preceding negating circuit is zero and the digit received from the corresponding operator is negative, or keeping the sign of the digit received from the corresponding operator when the flag received from the preceding negating circuit is positive or when the flag received from the preceding negating circuit is zero and the digit received from the corresponding operator is positive or zero, then outputting the digit to the preceding operator of the corresponding operator for a next iteration, and outputting a positive flag when the flag received from the preceding negating circuit is positive or when the flag received from the preceding negating circuit is zero and the digit received from the corresponding operator is positive, or outputting a negative flag when the flag received from the preceding negating circuit is negative or when the flag received from the preceding negating circuit is zero and the digit received from the corresponding operator is negative, and outputting a zero flag when the flag received from the preceding negating circuit is zero and the digit received from the corresponding operator is zero; and a quotient decision circuit for receiving the flag outputted by the negating circuit at the end of sequence, and performing exclusive-OR operation with a last flag outputted by the negating circuit at the end of sequence, then negating and outputting the result of the exclusive-OR operation as one of the digit of the quotient.

2. The digital device for finding a quotient from a divisor and a dividend as claimed in claim 1, further comprises a plurality of shift registers interposed between each of said circuits, for clocking data through said circuits.

3. The digital device for finding a quotient from a divisor and a dividend as claimed in claim 1, wherein the operator comprises two half-adders.

4. The digital device for finding a quotient from a divisor and a dividend as claimed in claim 1, further comprising a sign decision circuit for deciding the sign of the quotient by performing an exclusive-OR operation on the sign digits of the divisor and the dividend.

* * * * *